United States Patent [19]
Rinner

[11] Patent Number: 5,848,680
[45] Date of Patent: Dec. 15, 1998

[54] ACTUATOR CAP FOR A RATCHETING MECHANISM

[75] Inventor: James A. Rinner, Racine, Wis.

[73] Assignee: Beere Precision Medical Instruments, Inc., Racine, Wis.

[21] Appl. No.: 796,632

[22] Filed: Feb. 7, 1997

[51] Int. Cl.[6] .............................. B25B 15/04; F16D 41/16
[52] U.S. Cl. ............................................. 192/43.1; 81/62
[58] Field of Search ........................ 192/43.1, 43, 43.2, 192/44; 81/62, 61

[56] References Cited

U.S. PATENT DOCUMENTS

| 1,193,716 | 8/1916 | Purssell | 192/43.1 X |
| 2,584,256 | 2/1952 | Brown | 192/44 |
| 2,627,330 | 2/1953 | Gantz | 192/43.1 |
| 3,908,487 | 9/1975 | Plaw | 81/59.1 |
| 4,472,163 | 9/1984 | Bottini | 192/64 X |
| 4,777,852 | 10/1988 | Herman et al. | 81/63.1 |
| 5,570,616 | 11/1996 | Thompson et al. | 192/43.2 X |
| 5,573,093 | 11/1996 | Lee | 192/43.2 |
| 5,613,585 | 3/1997 | Tiede | 192/43.1 |
| 5,619,891 | 4/1997 | Tiede | 192/43.1 X |
| 5,687,820 | 11/1997 | Lin | 192/43.2 |

*Primary Examiner*—Rodney H. Bonck
*Attorney, Agent, or Firm*—Arthur J. Hansmann

[57] ABSTRACT

A tool with ratcheting mechanism having two pawls and a gear mounted on a tool handle. A cap encloses the ratcheting mechanism and serves as an actuator for moving the pawl into and out of engagement with the gear.

16 Claims, 5 Drawing Sheets

ACTUATOR CAP FOR A RATCHETING MECHANISM

This application pertains to an actuator cap for a ratcheting mechanism, and, more particularly, pertains to a ratcheting mechanism arrangement for utility in a hand-manipulated tool, such as a screwdriver.

BACKGROUND OF THE INVENTION

Ratcheting mechanisms are well known in the art, and also known are actuator caps which are rotatably mounted on a handle which houses the ratcheting mechanism, and the cap is available for actuation of the mechanism to put it into a drive mode or a ratchet mode in opposite direction of rotation of the handle. In that arrangement, the actuator cap at least partly encloses the ratcheting mechanism and permits the tool bit, such as a screwdriver shank, to project therethrough. Thus, when the cap is rotated in one direction, the ratcheting mechanism is set in a certain arrangement so that the tool bit can drive, for instance, in a selected direction which may be the same or different from the cap-rotated direction.

The significance of the foregoing is that the actuator cap is rotatably mounted on the tool handle and is normally secured thereon by means of a snap spring or the like which interacts between the cap and the handle and which can be released for removing the cap from the handle. However, it is that arrangement that is different from the invention disclosed and claimed herein in that the present arrangement does not utilize the snap spring for releasably retaining the cap.

Accordingly, an object of this invention is to provide a connection between the cap and the handle which permits the cap to be rotated, but which also permits the cap to be removed from the handle and does not employ the snap spring arrangement mentioned. In the present arrangement, there is a bayonet-type of interconnection between the cap and the handle, such that, upon assembly of the two, the cap can be moved toward the handle and the bayonet portions can be interengaged between the cap and the handle for rotatably but releasably securing the cap on the handle.

Additionally, the present invention provides an arrangement for limiting the degree of rotation of the cap on the handle, such that the inadvertent disengagement of the bayonet projections will not occur upon cap rotation, and also those limits on the rotation are coordinated with the positioning of the cap, as a ratcheting mechanism actuator, so that the ratcheting mechanism is set in the desired selected one of perhaps three positions of forward, reverse, and neutral where the drive is in both directions.

Still further, it is an object of this invention to accomplish the aforementioned and to also provide a means for readily releasing the cap from the handle to achieve the disassembly of the parts when desired.

Still further, it is an object of this invention to provide that there is a plunger interconnected between the cap and the handle and the plunger serves the dual function of limiting the degree of cap rotation during actuation and also establishes the three aforementioned operative positions.

Still further, the present invention provides a ratcheting mechanism actuator cap which is of an annular configuration and which therefore, upon actuation in either direction of rotation, it immediately indicates the drive direction for the working tool held and presented by the ratcheting mechanism. In fact, when the round cap is rotated in a clockwise direction, then the ratcheting mechanism drives in that clockwise direction even though it is eventually capable of driving in the opposite direction when it is set in a different position.

BRIEF DESCRIPTION OF THE DRAWINGS

FIG. 8 is an enlarged sectional view of FIG. 3.

DETAILED DESCRIPTION OF THE PREFERRED EMBODIMENT

Figure 1:
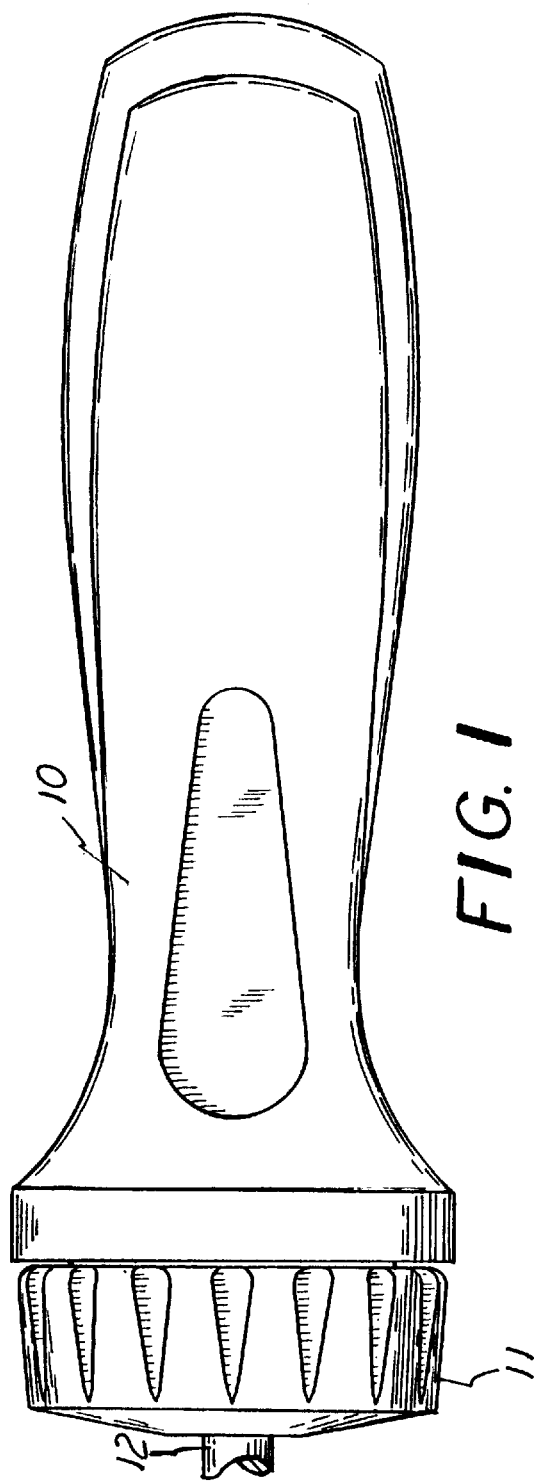
FIG. 1 is a side elevational view of the tool of this invention.

FIG. 1 shows the invention in that it shows a hand-manipulable tool having a handle 10 extending longitudinally from left to right as viewed, and it has an actuator cap 11 rotatable thereon on the longitudinal axis of the handle 10. It will be understood that the tool is particularly useful in supporting a screwdriver bit, such as indicated at 12.

Figure 2:
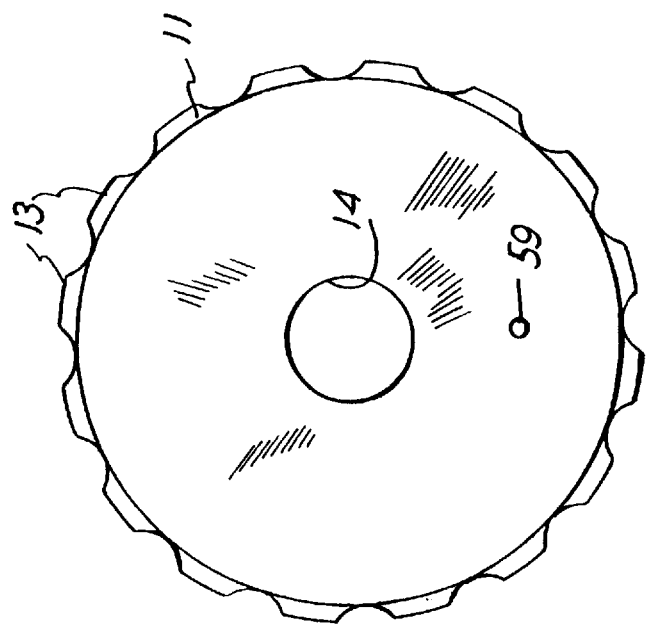
FIG. 2 is a left end elevational view of FIG. 1, on an enlarged scale.

FIG. 2 shows the left side elevational view of the cap 11, and it will of course be seen that it has a plurality of projections 13 which can be gripped by the operator for rotating the cap 11 in either direction on the handle 10. Also, the cap is shown to be circular and it has a central opening 14 through which the tool bit, such as bit 12, can project.

Figure 3:
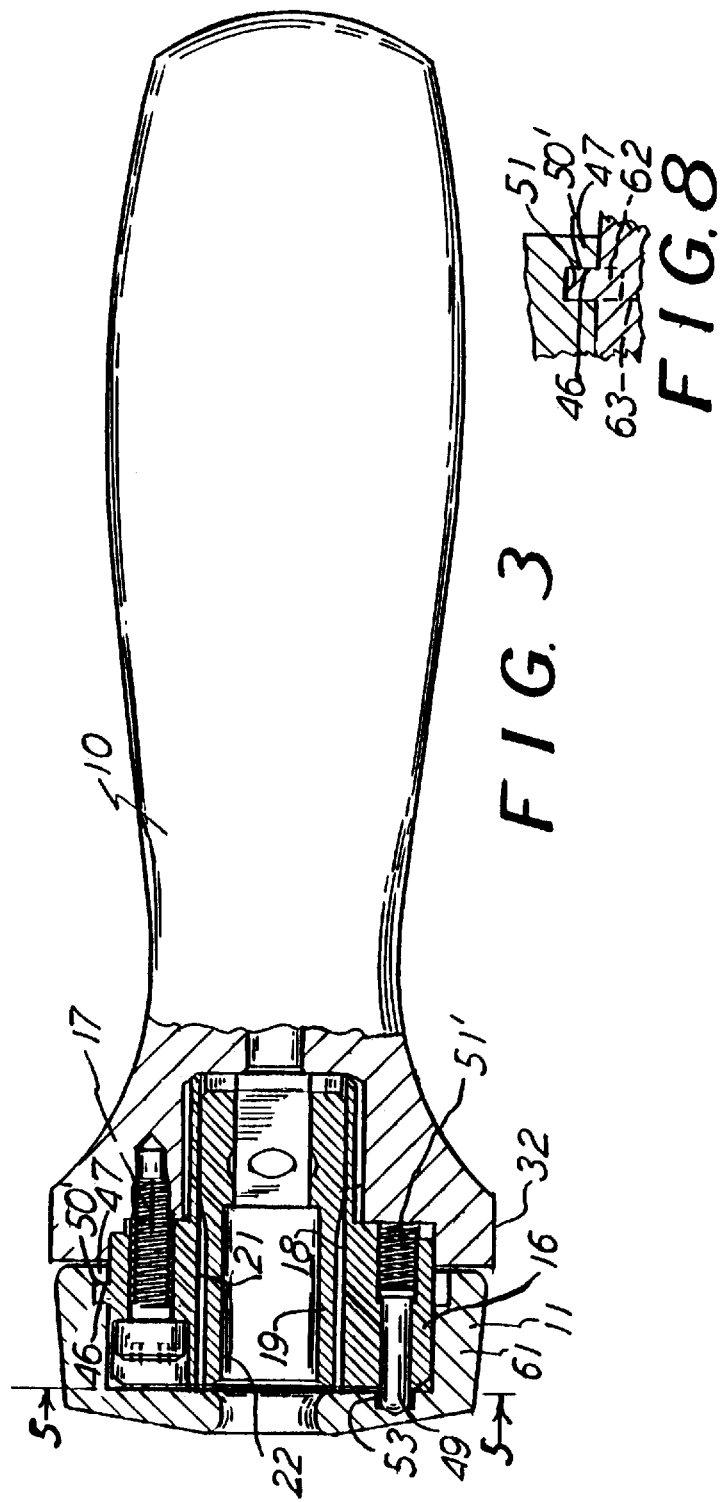
FIG. 3 is a longitudinal sectional view of the tool of FIG. 1.

FIG. 3 shows a longitudinal sectional view of the tool, and here the assembly of the handle 10 and cap 11 are shown, and it will also be noticed that there is a circular insert member 16 which is secured to the end of the handle 10 by means of screws 17, as shown. The insert 16 has a central opening 18 which rotatably receives a tubular-shaped gear piece 19 which has gear teeth 21 around the exterior circumference thereof, Thus, the tool bit 12 is inserted into the opening 22 of the gear piece 19 and, when the handle 10 and gear piece 19 are in driving connection therebetween, as hereinafter described, then the bit 12 will rotate as desired.

Figure 4:
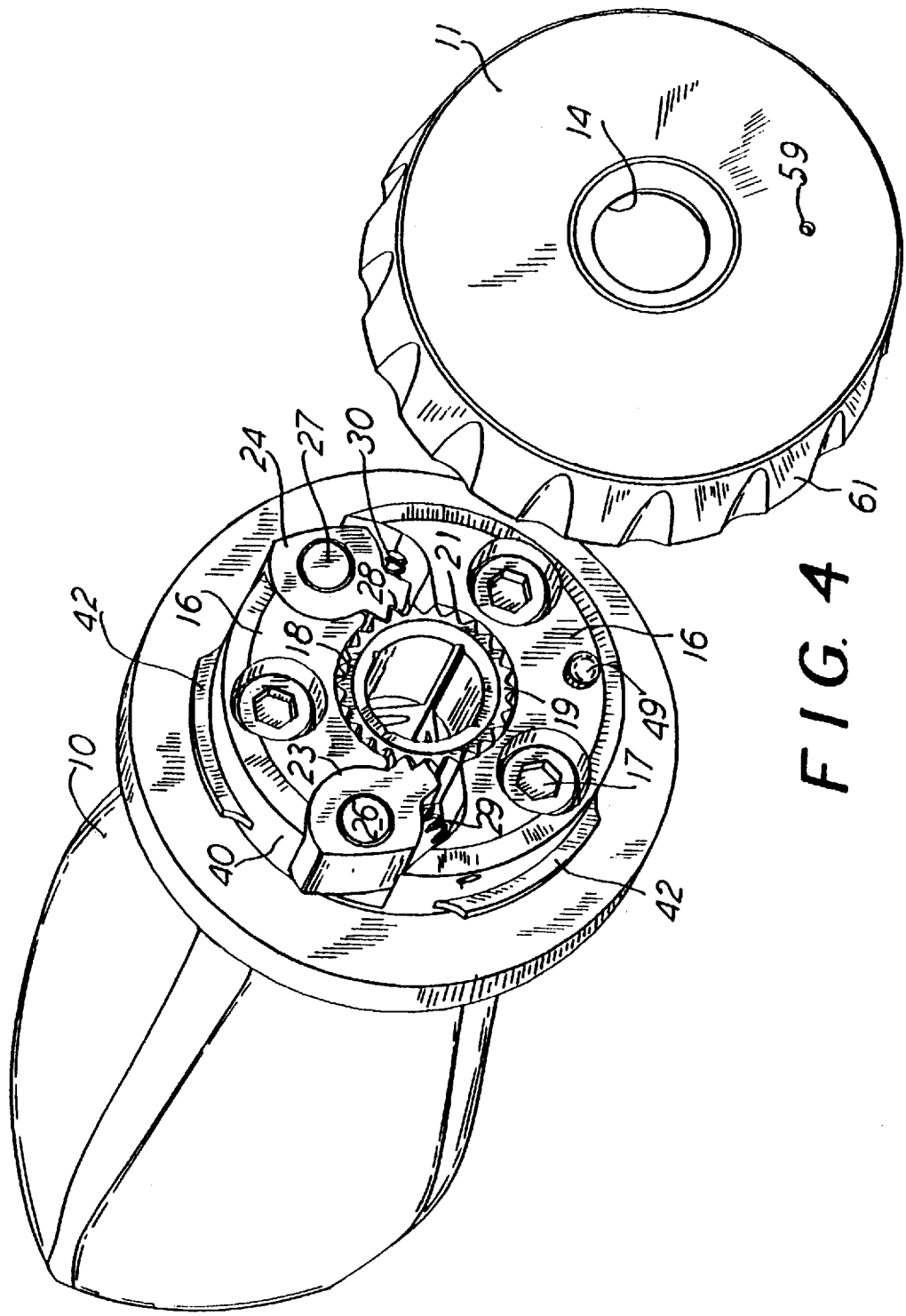
FIG. 4 is an exploded and perspective view of the tool of FIG. 1 and on an enlarged scale.

FIG. 4 shows the handle 10 with the insert 16 and the tubularly-shaped gear piece 19. FIG. 4 also shows that there are two pivotally movable pawls 23 and 24 mounted on pins 26 and 27 on the insert 16, and these pawls are shown to have teeth 28 which engage the gear teeth 21. Also, there are compression springs 29 and 30 which bear against the respective pawls 23 and 24 to urge the pawls into gear engagement, as shown in FIG. 4, The annular cap 11 is also seen in FIG. 4, and it will be seen and understood that the external circumference of the cap 11 is substantially the same as the external circumference at 32 on the handle 10.

Figure 7:
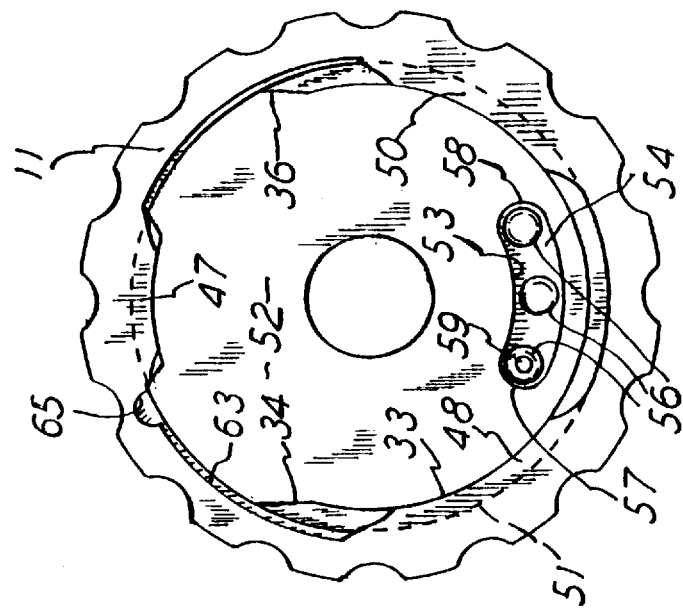
FIG. 7 is a right side elevational view of the cap of FIG. 2.
Figure 5:
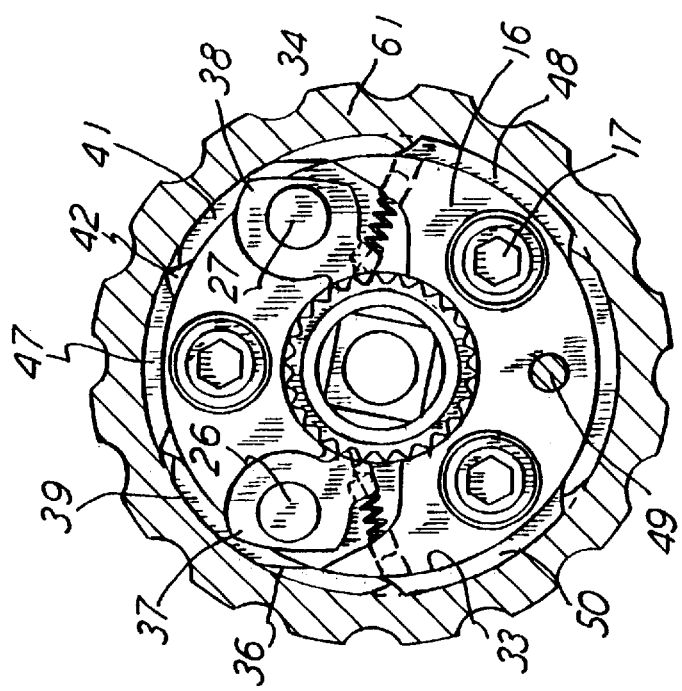
FIG. 5 is a sectional view taken along the lines 5—5 of FIG. 3.

Thus, the pawls 23 and 24 and the gear 19 present the ratcheting mechanism, and the cap 11 is the actuator cap which controls the positioning of the pawls for the purpose of ratcheting in either directional rotation or in neither direction if and when the cap is so positioned. To achieve the selected ratcheting mentioned, the interior cylindrical surface 33, such as seen in FIGS. 5 and 7, has two spaced-apart recesses 34 and 36 therein, and recesses 34 and 36 are available for receiving the radially exterior pawl tips 37 and 38 on the respective pawls such as shown in FIG. 5. It will also be seen and understood that when the cap 11 is rotated to a position where the cap circumference 33 abuts either or both of the pawl tips 37 and 38, then those tips are moved radially inwardly for disengagement of the pawls from the central gear. This arrangement is as in a companion patent application Ser. No. 08/553,866, filed Nov. 6, 1995 and now U.S. Pat. No. 5,619,891. That patent is incorporated herein by reference. At this time it will be seen and understood that the interior circumference 33 of the cap also has two spaced-apart recesses 39 and 41 for the reception of the pawl tips 37 and 38, respectively, when the pawls are in the fully engaged FIG. 5 position. Of course, upon rotating the cap 11, either pawl is brought out of engagement with the central gear, as desired. Again, the disclosure of said patent is incorporated herein by reference thereto.

Figure 6:
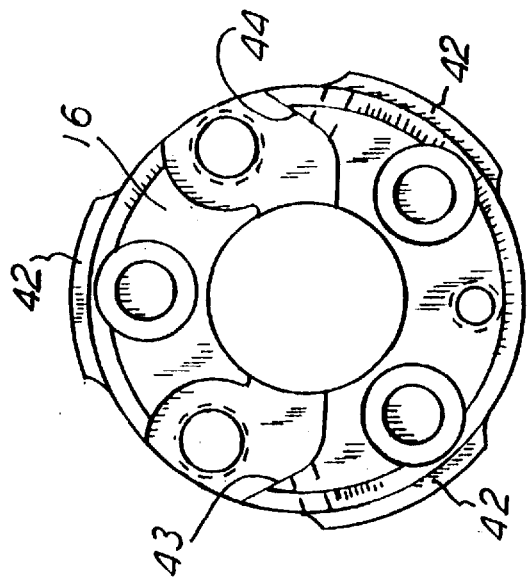
FIG. 6 is a left end elevational view of the insert of the tool, as seen in FIG. 3.

An important feature of the invention is to provide bayonet-type projections on both the handle 10 and the cap 11, for their mating engagement, such as shown in FIG. 3. Thus, FIG. 4 shows three upstanding walls or projections 42 spaced around the handle 10 and being integral with the insert 16. These projections extend beyond the circumference 40 of the insert piece 16, as shown. FIG. 6 also shows that arrangement where the insert 16 is shown without the pawls therein but it is to be recognized that the insert 16 has pockets 43 and 44 for respective receipt of the pawls 37 and 38 which are pivotally mounted on mounting posts 26 and 27.

The cap 11 has three radially inwardly extending projections 47, 48, and 50, as best seen in FIGS. 3 and 7. These three projections extend radially inwardly off a circle designated 51 extending around the interior of the cap 11. These three projections are spaced apart, as shown, and the projection 47 is slightly shorter in its extent around the circumference, compared to the other two projections 48 and 50. That arrangement will provide for sliding the cap onto the handle and passing over the pawl tips 37 and 38, if they are projecting, or over one pawl and depress the other one.

Thus, in assembly and disassembly of the cap 11 relative to the handle 10, the projections on the cap 11 are aligned with the spaces and projections on the handle 10 and the cap is moved axially toward the handle 10 until it achieves its position where it can be rotated in order to have its axially-facing surfaces, as designated 46 in FIG. 3, move into contact with the axially-facing surfaces 50' of the handle projections. That is, there is the bayonet type of relationship achieved upon relative rotation between the cap 11 and the handle 10 and the respective projections interengage with each other in order to secure the cap 11 against relative longitudinal axial movement relative to handle 10, as desired, (see FIG. 8)

In that manner, and by the bayonet type of interconnection, the cap is secured to the handle 10 to avoid any further axial movement relative between the two parts, however the cap 11 is still at liberty to rotate about the longitudinal axis, though that rotation is limited, as hereinafter described. However, it is that limited rotation which provides for the control of the positioning of the pawls for the desired ratcheting condition, FIGS. 3 and 4 show that the insert 16 supports a plunger or pin 49 which is under the influence of a compression spring 51' seated against the handle 10 to thereby urge the plunger 49 leftwardly, as viewed in FIG. 3, Also, the cap interior and transverse wall 52 has an arcuate groove 53 formed therein, and that groove presents a bottom wall 54 which in turn has three holes 56, as best seen in FIG. 7. The groove 53 and the holes 56 aligned with the plunger 49, such as shown in the alignment in FIG. 3. In that arrangement, the limited rotation of the cap is such that separately the holes 56 are aligned with the plunger 49 which thereby enters the aligned holes 56 and precludes free or relatively easy rotation of the cap 11 on the handle 10. However, it will be understood that when the operator simply rotates the cap 11 under finger pressure, the extended tip of the pin 49, which is rounded, and the base of each hole 56, which is likewise rounded, will permit the cap 11 to be moved to another one of the three positions indicated by notches or openings 56.

Still further, the length of the groove 53 is short, relative to the length of two mating projections on the handle 10 and cap 11 so that the cap 11 can be rotated within the rotational limit of the groove 53 and it will not cause the bayonet connection to become disconnected. That is, the projections for the bayonet connection will not pass beyond each other, but the cap will remain in its axially secure relationship with the handle 10. In that arrangement, the arcuate length of the groove 53 is less than twice the length of the total length of two interengaged projections on the handle 10 and cap 11. Again, that is the cap 11 cannot be rotated to a degree where the cap can be removed from the handle 10, and that is because of that shorter length of the groove 53, as shown and mentioned. In that regard, the pin or plunger 49 serves as both the temporary restrainer or locator for the rotated position of the cap 11 and it also serves the limiter for maximum rotation of the cap 11 in the assembled position on the handle 10. The groove 53 therefore presents end walls or stops 57 and 58 which are spaced apart for that limited length, compared to the total length of one projection on the cap and one projection on the handle where those two projections are mated with each other.

In order to permit dis-assembly of the cap 11 from the handle 10, the cap 11 has a small hole, in the nature of a pin hole 59 extending through the wall 52 and to the exterior of the cap, as seen in FIGS. 4 and 7. That pin hole is aligned with the cap notch or pocket 56, as shown in FIG. 7, and thus one can insert a pin tool through the hole 59 and depress the plunger 49 so that it will be moved out of the groove 53 and thus permit the cap 11 to be rotated to where the bayonet projections become disconnected from each other, at that time the cap 11 can be removed from the handle 10.

The groove 53 is located at a lesser radius than that of the location of the projections 47, 48, and 50. Therefore, it can be stated that the groove 53 is of a length sufficiently short, and the projections are located and of lengths sufficient to preclude the projections becoming disconnected from each other when the cap 11 is rotated to the maximum degree allowed by the groove 53.

Depressing plunger 49 will permit the cap 11 to be rotated to where the bayonet connection becomes disconnected, Then it is possible to insert a tool into an access opening 65 in the tubular wall 61 and depress one of the pawl tips 37 or 38 and thereby have the cap wall 61 clear the pawls for removal of the cap 11.

The rotational sliding inter-lock between the mating projections on the cap 11 and the base member 10 is arranged such that the maximum circular degrees of rotation of the cap 11 without effecting disconnection is greater than the circular degrees of rotation of said cap to its maximum as limited by the stops of groove 53.

FIGS. 7 and 8 show the cap 11 has an interior shape where there is a groove 62 adjacent each projection 47, 48, and 50 and is formed on one side by the inner wall 46 of each projection 47, 48, and 50 and on the bottom by the circle 51. So there is a circular shoulder 63 in the cap 11 which axially traps the projections 42 along with the cap projections 47, 48, and 50.

I claim:

1. In a tool with ratcheting mechanism including a base member having a longitudinal axis, a gear rotatably supported in said base member on said axis, two pawls movably disposed on said base member for selective drive engagement with said gear and said base member, and an annular cap releasably connected with said base member and aligned on said axis and being rotatable thereon about said axis and being arranged for disengaging said pawls from said gear upon rotation of said cap, the improvement comprising:

said base member and said cap having mutually and releasably engageable bayonet-type interconnecting surfaces for releasably mounting said cap onto said base member in response to relative rotation between said base member and said cap about said axis, said interconnecting surfaces being relatively rotatable about said axis and being in contact with each other in the direction along said axis to thereby limit movement of said cap in said direction and relative to said base member, a spring operatively arranged between said cap and said base member for urging said cap in said direction, and said cap and said base member having an interconnection for limiting relative rotation of said cap on said base member to thereby retain said interconnecting surfaces in contact with each other.

2. The tool with ratcheting mechanism as claimed in claim 1, wherein said spring and said interconnection are in combination such that they are arranged with said interconnection including a surface defined by end stops and being disposed transverse to said axis, and a stop member movable onto said surface in response to the urging of said spring to thereby limit rotational movement of said cap relative to said base member.

3. The tool with ratcheting mechanism as claimed in claim 2, wherein said cap has an access opening relative to said stop member for moving said stop member clear of said stops for removal of said cap upon rotation thereof on said base member.

4. The tool with ratcheting mechanism as claimed in claim 2, wherein a portion of said interconnection is a plunger mounted on said cap to be movable thereon parallel to said axis and to extend into the space between said end stops, and said spring being operative on said plunger to releasably retain said plunger between said end stops.

5. The tool with ratcheting mechanism as claimed in claim 4, wherein said cap has an access opening relative to said plunger for moving said plunger clear of said stops for removal of said cap upon rotation thereof on said base member.

6. The tool with ratcheting mechanism as claimed in claim 1, wherein said interconnection includes a plunger on said base member and being movable parallel to said axis and includes a groove on said cap and with said plunger being slidable in said groove and being arranged to rotate said cap on said base member to the limit of the bayonet-type engagement of said interconnection surfaces, and said spring is arranged to urge said plunger into said groove.

7. In a tool with ratcheting mechanism including a base member having a longitudinal axis, a gear rotatably supported in said base member on said axis, two pawls movably disposed on said base member for selective drive engagement with said gear and said base member, and an annularly shaped cap releasably connected with said base member and aligned on said axis and being rotatable thereon about said axis and being arranged for disengaging said pawls from said gear upon rotation of said cap, the improvement comprising:

said base member and said cap each having a plurality of projections spaced apart in a circular pattern and arranged to be mutually and releasably engageable for releasably mounting said cap onto said base member in response to relative rotation between said base member and said cap about said axis, the extents of said projections in said circular pattern being limited so that said projections can move past each other in the direction along said axis during the connecting and disconnecting of said cap relative to said base member, a spring operatively arranged between said cap and said base member for urging said cap in the direction along said axis, and said cap and said base member having an interconnection with spaced apart end stops effective upon rotational movement of said cap on said base member and with said end stops being spaced apart a distance less than twice said extents of the total of one of said projections from each of said base member and said cap, for limiting relative rotation of said cap on said base member to thereby retain said cap on said base member.

8. The tool with ratcheting mechanism as claimed in claim 7, wherein said interconnection includes a stop member, and said cap has an access opening relative to said stop member for moving said stop member clear of said stops for removal of said cap upon rotation thereof on said base member.

9. The tool with ratcheting mechanism as claimed in claim 8, wherein a portion of said interconnection is a plunger mounted on said cap to be movable thereon parallel to said axis and to extend into the space between said end stops, and said spring being operative on said plunger to releasably retain said plunger between said end stops.

10. The tool with ratcheting mechanism as claimed in claim 9, wherein said cap has an access opening relative to said plunger for moving said plunger clear of said stops for removal of said cap upon rotation thereof on said base member.

11. In a tool with ratcheting mechanism including a base member having a longitudinal axis, a gear rotatably supported in said base member on said axis, two pawls movably disposed on said base member for selective drive engagement with said gear and said base member, and an annularly shaped cap releasably connected with said base member and aligned on said axis and being rotatable thereon about said axis and being arranged for disengaging said pawls from said gear upon rotation of said cap, the improvement comprising:

said base member and said cap each having a plurality of projections spaced apart in a circular pattern and arranged to be mutually and releasably engageable for releasably mounting said cap onto said base member in response to relative rotation between said base member and said cap about said axis, the extents of said projections in said circular pattern being limited so that said projections can move past each other in the direction along said axis during the connecting and disconnecting of said cap relative to said base member, a plunger on said base member and being movable parallel to said axis, said cap having a dead-end groove with end stops and said plunger being disposed in said groove for restricting rotational movement of said cap on said base member to an amount less than twice the total extent of one of said projections from each of said base member and said cap along said circular pattern, whereby said projections can not move past and free of each other, and a spring on said base member for urging said plunger into said groove.

12. The tool with ratcheting mechcanism as claimed in claim 11, wherein said cap has an access opening relative to said plunger for moving said plunger clear of said groove for removal of said cap upon rotation thereof on said base member.

13. The tool with ratcheting mechanism as claimed in claim 11, wherein said groove has a dead-end bottom with notches in said bottom selectively individually aligned with said plunger upon rotation of said cap for releasably receiving said plunger to releasably control rotation of said cap and thereby control the actuation of said ratchet mechanism.

14. In a tool with ratcheting mechanism including a base member having a longitudinal axis, a gear rotatably supported in said base member on said axis, two pawls movably disposed on said base member for selective drive engagement with said gear and said base member, and an annular cap releasably connected with said base member and aligned on said axis and being rotatable thereon about said axis and being arranged for disengaging said pawls from said gear upon rotation of said cap, the improvement comprising:

said base member and said cap having mutually and releasably engageable bayonet-type interconnecting projections for releasably mounting said cap onto said base member in response to relative rotation between said base member and said cap about said axis, said interconnecting projections being relatively rotatable about said axis and being in contact with each other in the direction along said axis to thereby limit movement of said cap in said direction and relative to said base member, a spring operatively arranged between said cap and said base member for urging said cap in said direction, said cap and said base member having and interconnection for limiting relative rotation of said cap on said base member to thereby retain said interconnecting projections in contact with each other, and said cap having a groove adjacent each of its said projections for receiving said projections of said base member and thereby limiting axial movement of said cap on said base member in both axial directions.

15. The tool with ratcheting mechanism as claimed in claim 14, wherein said cap has a limit of angular rotation of said cap as presented by said interconnection which is less than the angular rotation required to rotate said cap projections free of said base member projections.

16. The tool with ratcheting mechanism as claimed in claim 15, wherein said cap has an access hole for disconnecting said interconnection and it has an access opening for moving one of said pawls away from said cap to free said cap from said one pawl in the disassemby of said cap from said base member.

* * * * *